(12) United States Patent
Kikuchi et al.

(10) Patent No.: US 6,560,193 B2
(45) Date of Patent: May 6, 2003

(54) DISC CARTRIDGE

(75) Inventors: Shuichi Kikuchi, Miyagi (JP); Rie Izu, Miyagi (JP)

(73) Assignee: Sony Corporation, Tokyo (JP)

( * ) Notice: Subject to any disclaimer, the term of this patent is extended or adjusted under 35 U.S.C. 154(b) by 59 days.

(21) Appl. No.: 09/799,294

(22) Filed: Mar. 5, 2001

(65) Prior Publication Data

US 2001/0028533 A1 Oct. 11, 2001

(30) Foreign Application Priority Data

Mar. 7, 2000 (JP) ........................................ 2000-067210

(51) Int. Cl.⁷ .............................................. G11B 23/03
(52) U.S. Cl. ....................................... 369/291; 360/133
(58) Field of Search ........................... 369/291; 360/133

(56) References Cited

U.S. PATENT DOCUMENTS

| | | | |
|---|---|---|---|
| 4,497,009 A | * 1/1985 | Oishi et al. | 360/133 |
| 4,550,354 A | * 10/1985 | Wakabayashi et al. | 360/133 |
| 4,608,617 A | * 8/1986 | Oishi et al. | 360/133 |
| 4,740,949 A | 4/1988 | Davis | |
| RE32,876 E | * 2/1989 | Wakabayashi et al. | 360/133 |
| 5,073,889 A | * 12/1991 | Rayner | 360/133 |
| 5,481,420 A | 1/1996 | Cardona et al. | |
| 5,995,346 A | * 11/1999 | Schick et al. | 360/133 |
| 6,021,031 A | * 2/2000 | Hales et al. | 360/133 |
| 6,172,849 B1 | * 1/2001 | Schick | 360/133 |
| 6,178,067 B1 | * 1/2001 | Schick et al. | 360/133 |
| 6,377,538 B1 | * 4/2002 | d'Alayer de Costemore d'Arc | 369/291 |
| 2001/0040866 A1 | * 11/2001 | Shiomi et al. | 369/291 |
| 2002/0075796 A1 | * 6/2002 | Shiomi et al. | 369/291 |

FOREIGN PATENT DOCUMENTS

| EP | 000638901 A1 | * 2/1995 |
|---|---|---|
| EP | 0 788 103 | 8/1997 |
| EP | 0 973 163 | 1/2000 |

OTHER PUBLICATIONS

Patent Abstracts of Japan vol. 011, No. 151 (P–576), May 16, 1987 & JP 61 284886 A (Nippon Kogaku KK), Dec. 15, 1996.
Patent Abstracts of Japan vol. 1999, No. 03, Mar. 31, 1999 & JP 10 334629 A (Sony Corp), Dec. 18, 1998.

* cited by examiner

Primary Examiner—William Klimowicz
(74) Attorney, Agent, or Firm—Frommer Lawrence & Haug LLP; William S. Frommer; Leonard J. Santisi

(57) ABSTRACT

To provide a new shutter open/close mechanism (26) suitable for use with a cartridge body whose front end is formed in an arbitrary shape for easily knowing a correct direction of insertion in a recorder/player, a guide recess (36) to support a shutter plate (25) movably is formed on a main side of the cartridge body (6) to be oblique relative to the width of the cartridge body (6). The shutter open/close mechanism (26) includes a guide member (31) supporting the shutter plate (25) and movably engaged in the guide recess (36), an operating member (32) to move the guide member (31), a transmission member (33) connecting the guide member (31) and operating member (32) to each other to transmit an operating force from the operating member (32) to the guide member (31), and support surfaces (37) formed on the cartridge body (6) to support the operating member (32) movably. The shutter open/close mechanism 26 further includes a shutter locking mechanism 38 disposed at the lateral side of the cartridge body (6) to lock the shutter plate (25) against movement.

10 Claims, 16 Drawing Sheets

DISC CARTRIDGE

BACKGROUND OF THE INVENTION

1. Field of the Invention

The present invention relates to a disc cartridge having encased therein a disc-shaped recording medium such as an optical disc, magneto-optical disc or the like.

2. Description of the Related Art

As the disc-shaped recording medium, a disc cartridge having a magneto-optical disc for example encased therein has been proposed.

Referring now to FIG. 1, there is schematically illustrated a conventional disc cartridge in the form of a perspective view. In FIG. 1, the disc cartridge is generally indicated with a reference 201. The disc cartridge 201 includes a cartridge body 206 consisting of a pair of upper shell 211 and lower shell 212 assembled to each other. These upper and lower shells 211 and 212 are made of a resin material. Each of the upper and lower shells 211 and 212 of the cartridge body 206 has formed therein an access opening 215 having a generally rectangular shape. The access openings 215 are opposite to each other. Thus, a part of the recording area of the magneto-optical disc 205, extending between lead-in and lead-out areas, is exposed outside through the openings 215 for data read and write.

The lower shell 212 of the cartridge body 206 has formed therein adjacent or next to the access opening 215 a drive opening 217 through which a disc table (not shown) of a disc drive mechanism which drives to rotate the magneto-optical disc 205 comes into the cartridge body 206.

Further, the cartridge body 206 has a shutter member 220 mounted thereon as shown in FIG. 1. Normally, the shutter member 220 covers or closes the access openings 215 and drive opening 217. When the disc cartridge 201 is loaded into a recorder/player, the shutter member 220 will be moved and thus the access and drive openings 215 and 217 will be opened. The shutter member 220 consists of an upper shutter portion which closes and opens the access openings 215 in the upper shell 211, a lower shutter portion which closes and opens the access openings 215 and drive opening 217 in the lower shell 212, and a connection to which each of the upper and lower shutter portions is connected at one end thereof. Further, the cartridge body 206 has disposed therein an elastic member (not shown) to force the upper shutter portion of the shutter member 220 in a direction in which the upper shutter portion closes the access openings 215 and drive opening 217.

When the disc cartridge 201 constructed as in the above is loaded into the recorder/player, the shutter member 220 is moved by a shutter open/close member of the recorder/player to open the access openings 215 and drive opening 217. The disc table of the disc drive mechanism (not shown) of the recorder/player comes into the disc cartridge through the drive opening 217 to rotate the magneto-optical disc 205 in the disc cartridge 201, while the write/read head of the recorder/player comes into the disc cartridge 201 through the access openings 215 to write/read information to/from the magneto-optical disc 205.

In the aforementioned conventional disc cartridge 101, however, since the front end thereof at which the disc cartridge 201 is first inserted into and removed from the recorder/player is formed straight perpendicularly to the direction of insertion into the recorder/player and both the main sides of the cartridge body 206 are formed generally square, it is difficult to easily know the correct inserting direction of the disc cartridge 201 from its appearance.

Therefore, the conventional disc cartridge 201 is likely to be inserted in a wrong direction into the recorder/player.

In the conventional disc cartridge 201, the shutter member 220 is moved under the action of only the force of the elastic member to the position where it closes the access openings 215 and drive opening 217. Since in the conventional disc cartridge 201, the shutter member 220 can thus be moved easily to the open position against the force of the elastic member, there is a likelihood that the shutter member 220 is inadvertently opened.

OBJECT AND SUMMARY OF THE INVENTION

It is therefore an object of the present invention to overcome the above-mentioned drawbacks of the prior art by providing a disc cartridge having a body whose front end to be opposite to a recorder/player may be designed to have an arbitrary shape for easy knowing of a correct direction of insertion into the recorder/player and provided with a shutter open/close mechanism suitable for use with the cartridge body having the arbitrarily shaped front end.

The above object can be attained by providing a disc cartridge including according to the present invention a disc-shaped recording medium; a cartridge body having formed therein a disc compartment to house the disc-shaped recording medium; an access opening formed in the cartridge body and through which a part of the recording area of the disc-shaped recording medium, extending between lead-in and lead-out areas, is exposed outside for data read and write; and a shutter member provided movably to open and close the access opening. The disc cartridge also includes a shutter open/close mechanism having a guide recess formed in a main side the of the cartridge body to be oblique in relation to the width of the cartridge body to support the shutter member movably, a guide member supporting the shutter member and movably engaged in the guide recess, an operating member to move the guide member, a transmission member linking the guide member and the operating member to each other to transmit an operating force from the operating member to the guide member, and support surfaces formed on the cartridge body to support the operating member movably. Further, the disc cartridge includes a shutter locking mechanism disposed on the lateral side of the cartridge body to inhibit the shutter member from moving.

In the disc cartridge constructed as in the above, since the shutter member is inhibited from moving by the shutter locking mechanism, it is held to close the access opening.

In the above disc cartridge according to the present invention, the guide recess formed on a main side of the cartridge body to be oblique relative to the width of the cartridge body allows the front end of the cartridge body at which the disc cartridge is first inserted into the recorder/player to be formed in an arbitrary shape for easily knowing a correct direction of insertion in the recorder/player, so that the disc cartridge can be prevented from being inserted in a wrong direction into the recorder/player. Also, the shutter locking mechanism provided matching the cartridge body whose front end is formed in the arbitrary shape permits to lock and hold the shutter member in positions where it opens and closes the access opening.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
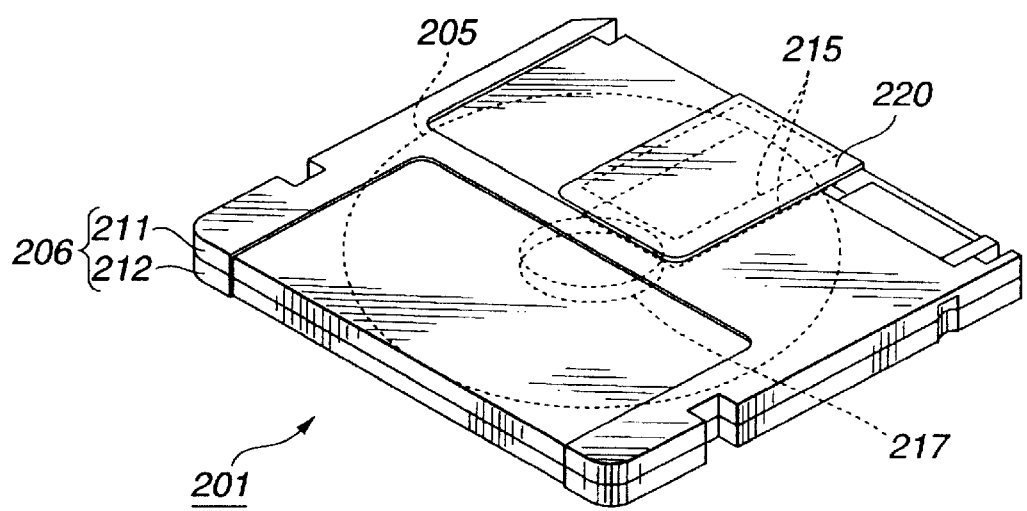
FIG. 1 is a perspective view of a conventional disc cartridge.
Figure 2:
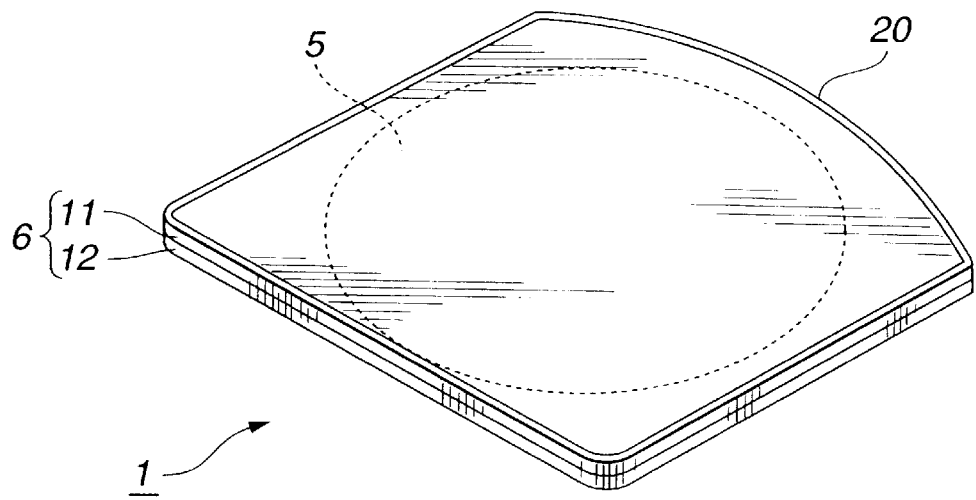
FIG. 2 is a perspective view of an embodiment of the disc cartridge according to the present invention.
Figure 3:
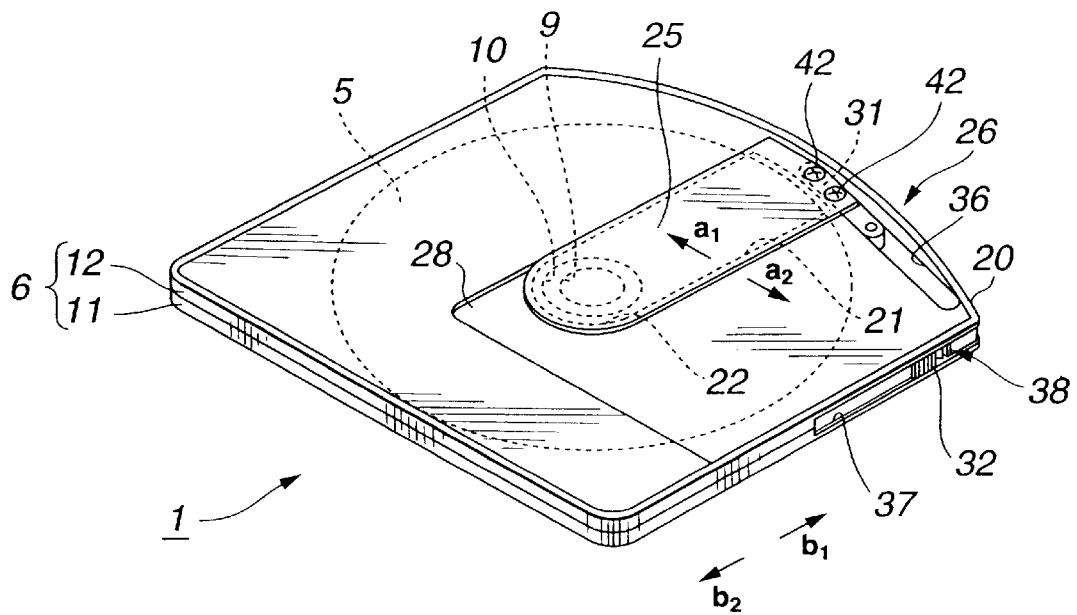
FIG. 3 is a perspective bottom view of the disc cartridge in FIG. 2.

Referring now to FIGS. 2 and 3, there is schematically illustrated in the form of a perspective view the embodiment of the disc cartridge according to the present invention. The disc cartridge is generally indicated with a reference 1. As shown, the disc cartridge 1 includes an optical disc 5 and a cartridge body 6 having the optical disc 5 rotatably encased therein.

Figure 4:
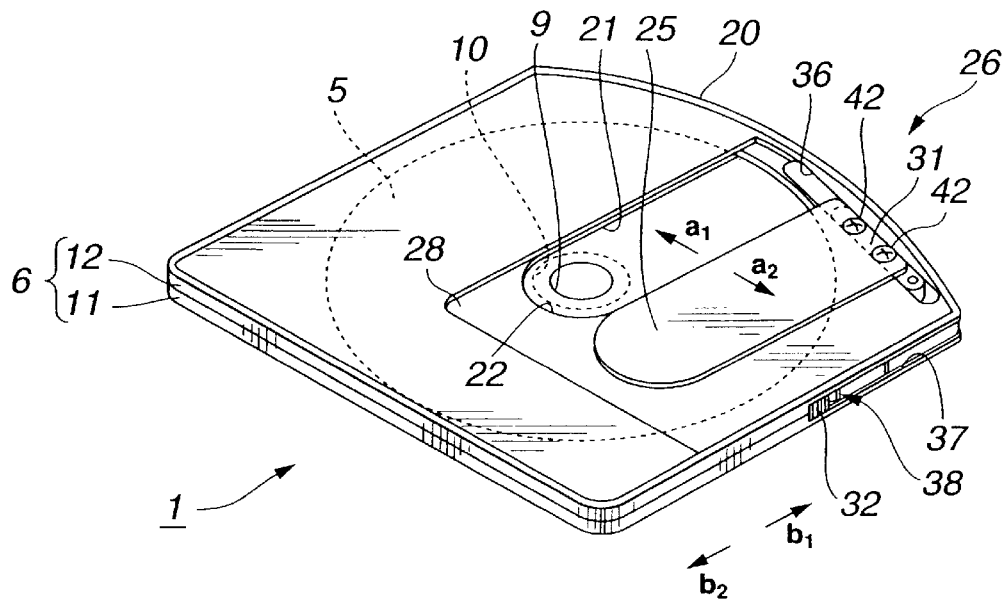
FIG. 4 is a perspective bottom view of the disc cartridge in FIG. 2, with the shutter plate being moved to the opened position.

As will seen from FIGS. 2, 3 and 4, the optical disc 5 is formed to have a disc-like form having a central hole 9. The optical disc 5 used herein is a CD (compact disc)-R (recordable) to which information can additionally be written, for example. It should be noted that the optical disc 5 may of course be an other optical disc such as a phase-change optical disc, magneto-optical disc or the like, which is a CD-RW (rewritable) in which information can be rewritable.

Figure 5:
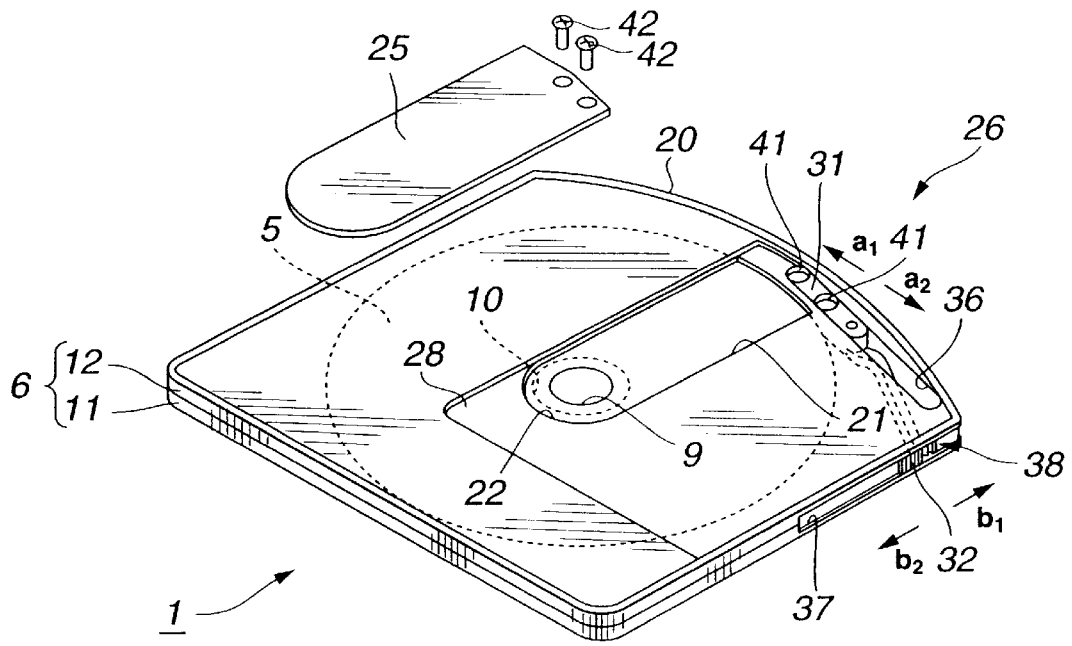
FIG. 5 is an exploded perspective bottom view of the disc cartridge in FIG. 2, for explanation of the shutter plate of the disc cartridge.
Figure 6:
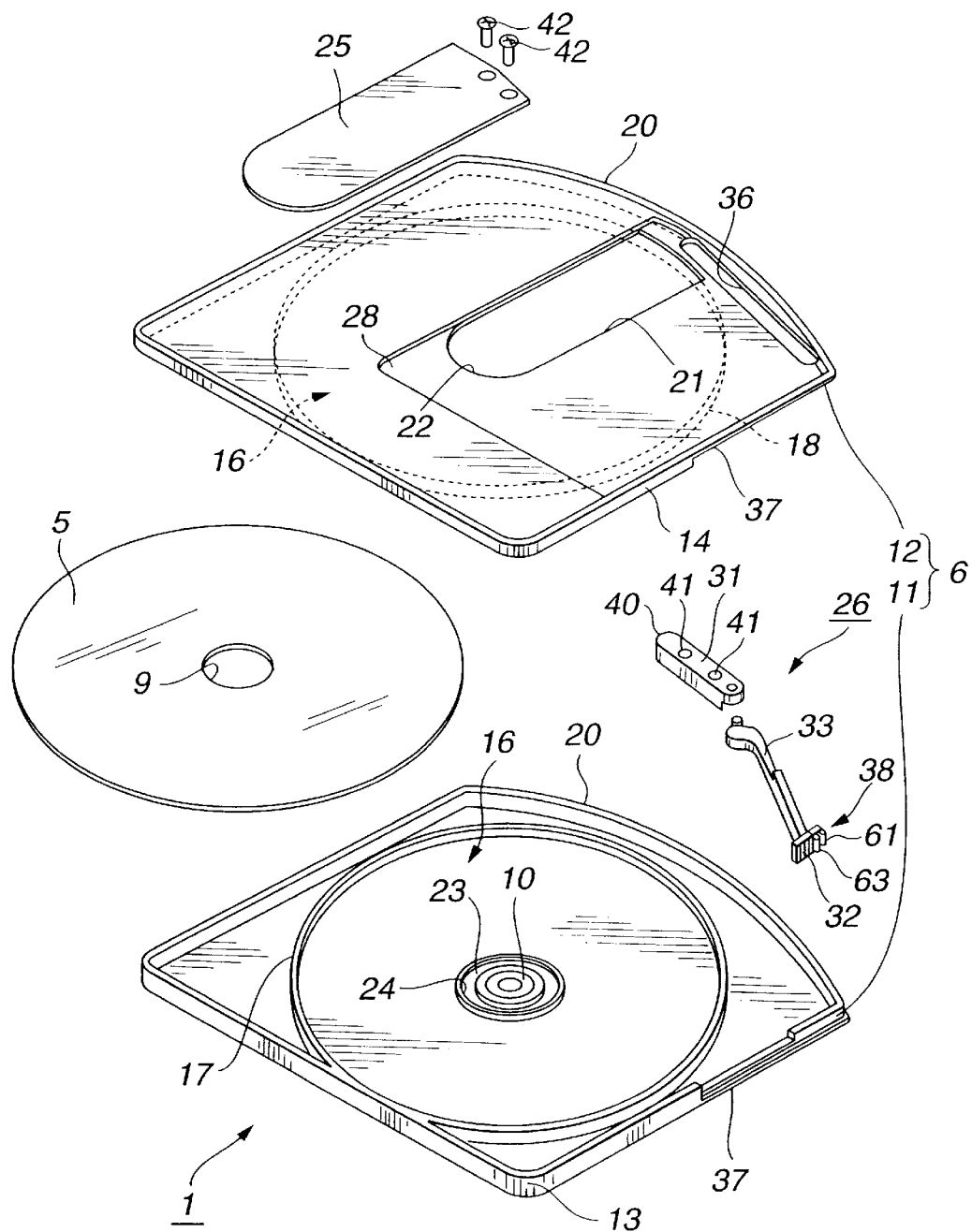
FIG. 6 is an exploded perspective bottom view of the disc cartridge in FIG. 2.

As shown in FIGS. 5 and 6, the cartridge body 6 consists of a pair of upper shell 11 and lower shell 12, assembled to each other. The upper and lower shells 11 and 12 are formed in the general shape of a box by injection molding of a resin such as polycarbonate. Note that the upper and lower shells 11 and 12 may be formed, in addition to polycarbonate, from a thermoplastic resin such as polystyrene, high-impact polystyrene, acryl styrol, acryl butyl styrol, polypropylene, denatured PPO (polyphenylene oxide) or the like.

As best shown in FIG. 6, the upper shell 11 and lower shell 12 has upright walls 13 and 14 formed along the respectively circumferences thereof. The upright circumferential walls 13 and 14 are made to abut each other to form the circumferential wall of the cartridge body 6 as shown in FIG. 6.

As shown in FIG. 6, each of the upper and lower shells 11 and 12 has formed in the inner side thereof a circular disc compartment 16 whose diameter is slightly larger than that of the optical disc 5 and in which the optical disc 5 is rotatably housed. The disc compartment 16 is formed, as shown in FIG. 6, by assembling circular upright walls 17 and 18 formed on the inner sides of the upper and lower shells 11 and 12. The upright walls 17 and 18 are generally as high as the circumferential upright walls 13 and 14 of the upper and lower shells 11 and 12. Thus, the upright circular walls 17 and 18 isolate the disc compartment 16, in which the optical disc 5 is provided, from the other inner space of the cartridge body 6.

Of the upper and lower shells 11 and 12, only front ends 20, of the upright circumferential walls 13 and 14, at which the disc cartridge 1 is to be first inserted into a recorder/player are formed generally circular as shown in FIGS. 2, 3 and 6. Therefore, seeing the front end of the cartridge body 6 when going to load the disc cartridge 1 into the recorder/player, he will easily know visually and by touching in which direction he should insert the disc cartridge into the recorder/player. Namely, the user will not insert the disc cartridge 1 in any wrong direction into the recorder/player. Note that the front end 20 may be formed to have a polyhedral shape or to be a combination of a curve and plane.

Also, the lower shell 12 has formed in the main side thereof a generally rectangular access opening 21 through which a write/read mechanism (not shown) of the recorder/player is to face the optical disc 5, as shown in FIG. 6.

Further, the lower shell 12 has formed in the main side thereof a circular drive opening 22 contiguous to the access opening 21 and through which a disc table (not shown) of a disc drive mechanism of the recorder/player is allowed to enter the cartridge body 6, as shown in FIG. 6.

As shown in FIG. 6, the lower shell 12 has formed near the center of the bottom thereof a compartment 23 defined by an annular projection 24, in which a chucking plate 10 is provided to clamp and hold the optical disc 5 at a center hole 9 thereof on the disc table of the recorder/player. The chucking plate 10 is formed from a magnetic metal such as stainless steel or the like to have a generally disc-like shape. It may be formed from iron and plated with nickel, chrome or the like or painted for rust prevention.

The aforementioned upper and lower shells 11 and 12 are assembled and joined to each other by ultrasonic welding for example. Alternatively, the upper and lower shells 11 and 12 may be designed so that they can be joined to each other with fixing screws driven, through prepared holes formed near corners of the main side, for example, of one of the shells, into screw holes formed in corresponding corners of the main side of the other shell and opposite to the prepared holes in the other shell.

Also, as shown in FIGS. 3, 4 and 5, the cartridge body 6 has provided thereon a shutter plate 25 provided thereon movably in directions of arrow $a_1$ and $a_2$ being opposite to each other widthwise of the cartridge body 6 to open and close the access opening 21 and drive opening 22, and a shutter open/close mechanism 26 to support the shutter plate 25 movably.

Figure 7:
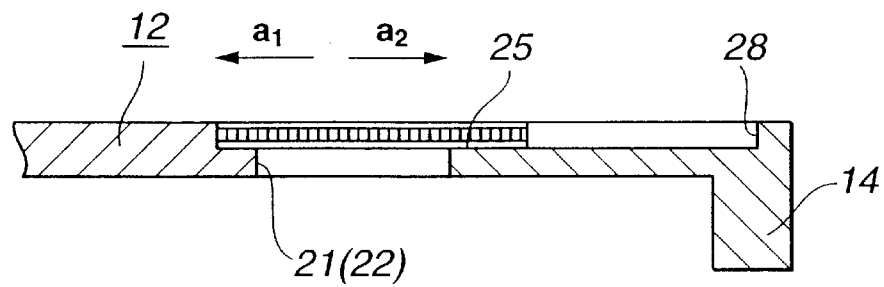
FIG. 7 is an axial sectional view for explanation of the shutter plate and concavity in which the shutter plate is moved.

The shutter plate 25 is made of a metal such as aluminum and formed flat to have a thickness of about 0.3 mm for example as shown in FIGS. 6 and 7. Note that the shutter plate 25 may be made of aluminum as the base and coated with Alumite or painted for rust prevention and decoration. Also, the shutter plate 25 may be formed by punching a thin sheet of stainless steel, polycarbonate, polystyrene, high-impact polystyrene, acryl styrol, acryl butyl styrol or the like, and its thickness is not limited to 0.3 mm but may appropriately be selected depending upon the material used.

As shown in FIGS. 3, 6 and 7, the shutter plate 25 is formed slightly larger than the access opening 21 and drive opening 22, and it is fixed at one end thereof to the shutter open/close mechanism 26.

As shown in FIGS. 5, 6 and 7, the cartridge body 6 has formed in the main side of the lower shell 12 a generally rectangular concavity 28 in which the shutter plate 25 is disposed movably. As shown in FIG. 7, the concavity 28 is formed to have an area a little larger than an area over which the shutter plate 25 is moved to open and close the access opening 21 and drive opening 22 and a depth slightly larger than the thickness of the shutter plate 25 that the shutter plate 25 will not project from the main side of the cartridge body 6.

Figure 8:
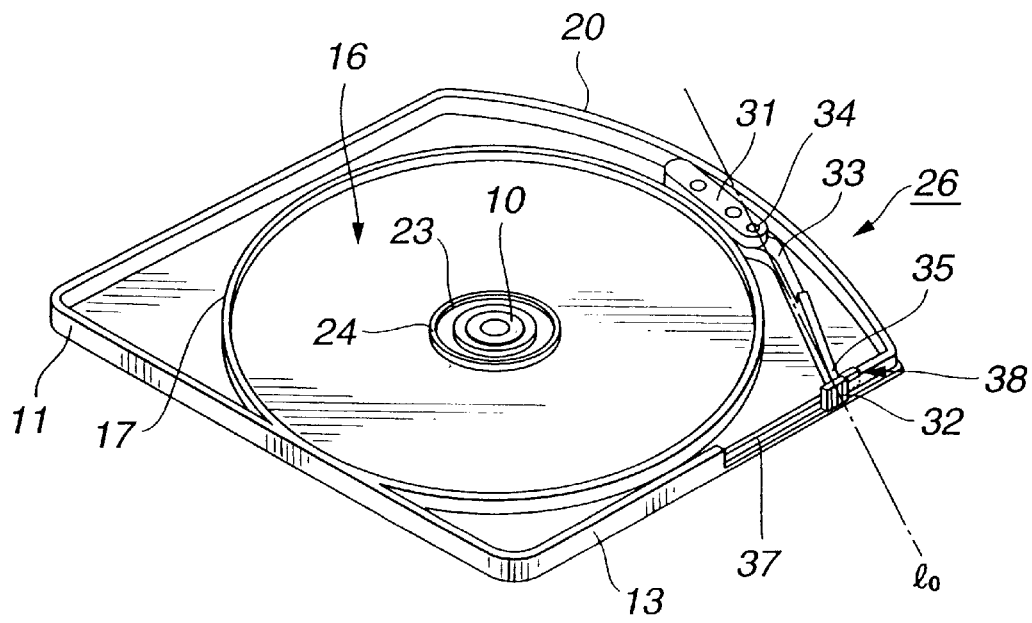
FIG. 8 is a perspective view for explanation of the shutter open/close mechanism.
Figure 9:
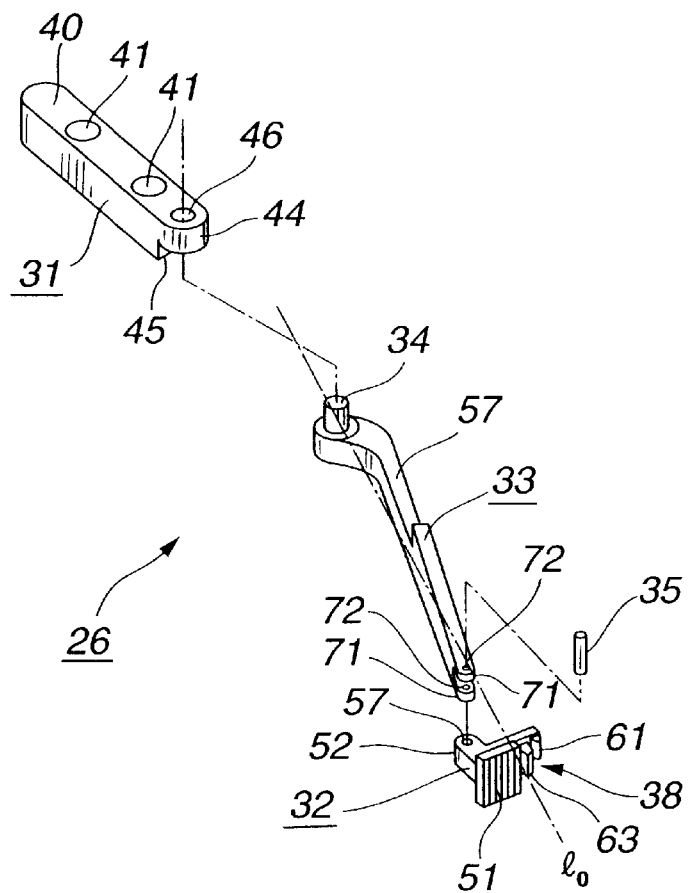
FIG. 9 is an exploded perspective view for explanation of the shutter open/close mechanism.

As will be seen from FIGS. 6, 8 and 9, the shutter open/close mechanism 26 is disposed in the inner space of the cartridge body 6, outside the upright walls 17 and 18 of the disc compartment 16. As shown, the shutter open/close mechanism 26 includes a guide member 31 to support the shutter plate 25, an operating member 32 to move the guide member 31, and a transmission member 33 linking the guide member 31 and operating member 32 to each other to transmit an operating force from the operating member 32 to the guide member 31.

Also, as shown in FIGS. 6, 8 and 9, the shutter open/close mechanism 26 includes a first pivot 34 to support the guide member 31 pivotably, a second pivot 35 to support the operating member 32 pivotably, a guide recess 36 to support the guide member 31 movably, and support surfaces 37 to support the operating member 32 movably in the directions of arrows $b_1$ and $b_2$.

As shown in FIG. 9, the shutter open/close mechanism 26 includes a shutter locking mechanism 38 to inhibit the shutter plate 25 from moving by locking the operating member 32.

As shown in FIGS. 8 and 9, the guide member 31 is formed from a thermoplastic synthetic resin such as polypropylene to have the shape of a block. The guide member 31 has formed on one side thereof a mount surface 40 to which the shutter member 25 is fixed at one end thereof with fixing screws 42 driven in screw holes 41 formed also in the mount surface 40.

Figure 10:
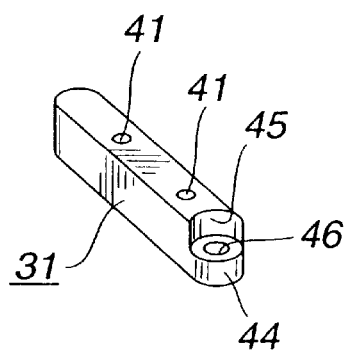
FIG. 10 is a perspective bottom view for explanation of a guide member of the shutter open/close mechanism.

As shown in FIGS. 9 and 10, the guide member 31 has one end thereof cut to about a half of its thickness to have a curved face 45 corresponding to one end of the transmission member 33. Thus the guide member 31 has an integral connecting end 44 to which the one end of the transmission member 33 is connected pivotably. The connecting end 44 has formed through it a pivot hole 46 through which the first pivot 34 is inserted, whereby the transmission member 33 is connected pivotably to the guide member 31.

Figure 11:
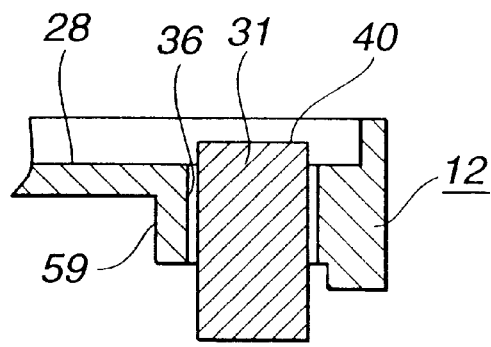
FIG. 11 is an axial sectional view for explanation of the guide member of the shutter open/close mechanism.

The guide member 31 is movably inserted in the guide recess 36 so as not to project from the concavity 28 to above the main side of the cartridge body 6, as shown in FIG. 11.

Figure 12:
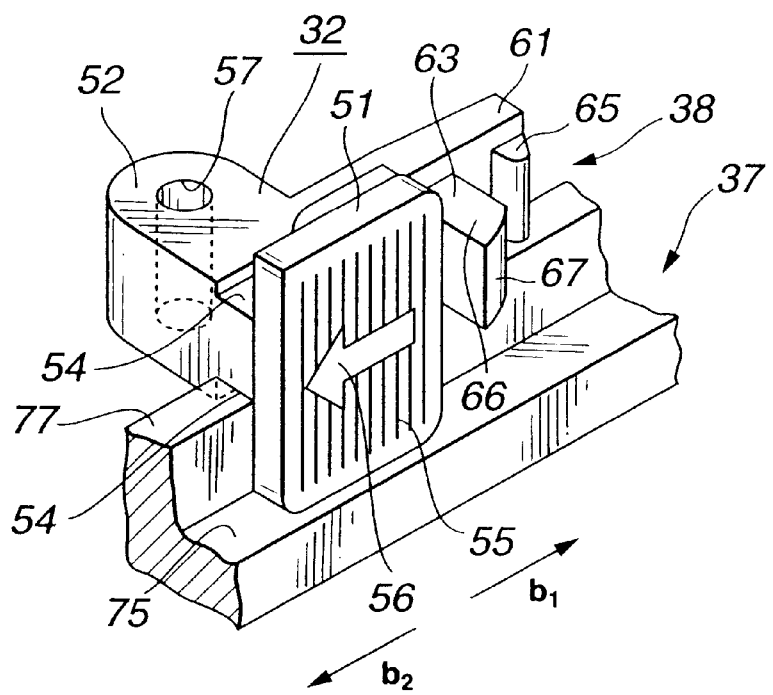
FIG. 12 is a perspective view for explanation of an operating member of the shutter open/close mechanism and shutter locking mechanism.
Figure 13:
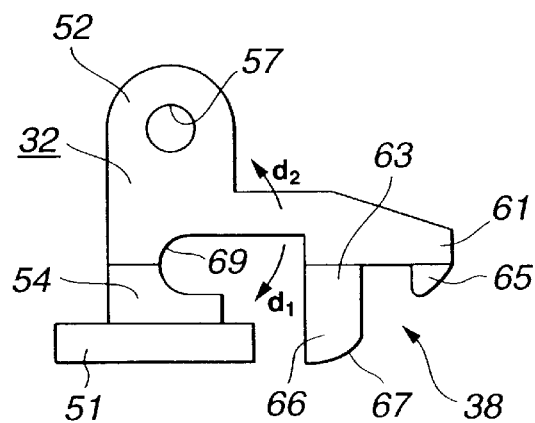
FIG. 13 is a plan view of the operating member and shutter locking mechanism.
Figure 14:
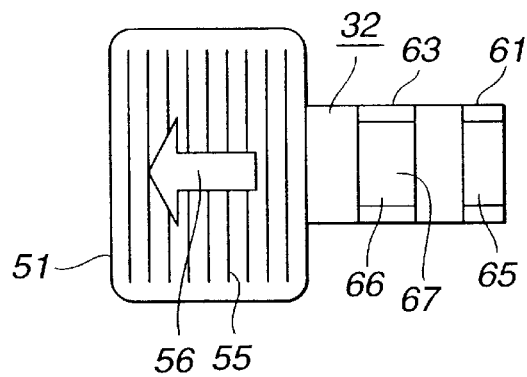
FIG. 14 is a front view of the operating member and shutter locking mechanism.
Figure 15:
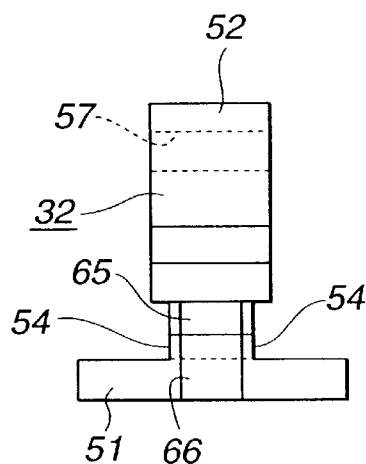
FIG. 15 is a side elevation of the operating member and shutter locking mechanism.

As shown in FIGS. 9 and 12, the operating member 32 has an operating piece 51 which is to be moved in the directions of arrows $b_1$ and $b_2$, and a coupling 52 formed integrally with the operating piece 51 and pivotably connected to one end of the transmission member 33. The operating member 32 has formed in a position adjacent to the operating piece 51 engagement recesses 54 in which the upper and lower shells 11 and 12 are engaged movably in the directions of arrows $b_1$ and $b_2$ as shown in FIGS. 12 and 13.

The operating piece 51 is formed as a generally rectangular flat piece. It is exposed outside the lateral side of the cartridge body 6 and has such a thickness that it will not protrude from the lateral side of the cartridge body 6. Also the operating piece 51 has formed on the outer surface thereof non-slip recesses 55 to prevent the user's finger applied on the operating piece 51 from slipping when the user operates the operating piece 51. The operating piece 51 has provided thereon a marking 56 such as an arrow to indicate the moving direction of the shutter plate 25 going to be opened. As shown in FIGS. 12 and 13, the coupling 52 has formed through it a pivot hole 57 through which the second pivot 35 is pivotably inserted.

Also, as shown in FIG. 12, the operating member 32 has a shutter locking mechanism 38 to inhibit the shutter plate 25 from moving. The shutter locking mechanism 38 includes a locking portion 61 to lock the operating member 32 against movement, engagement projection 62 with which the locking portion 61 engages, and an unlocking portion 63 to free the operating member 32 from being locked by the locking portion 61, as shown in FIG. 12.

As shown in FIGS. 12, 13, 14 and 15, the locking portion 61 is formed integrally with the coupling 52 of the operating member 32 to be elastically movable, and has an engagement pawl 65 engaging with the engagement projection 62 of the cartridge body 6. The engagement pawl 65 is protruded to the lateral side of the cartridge body 6.

Figure 16:
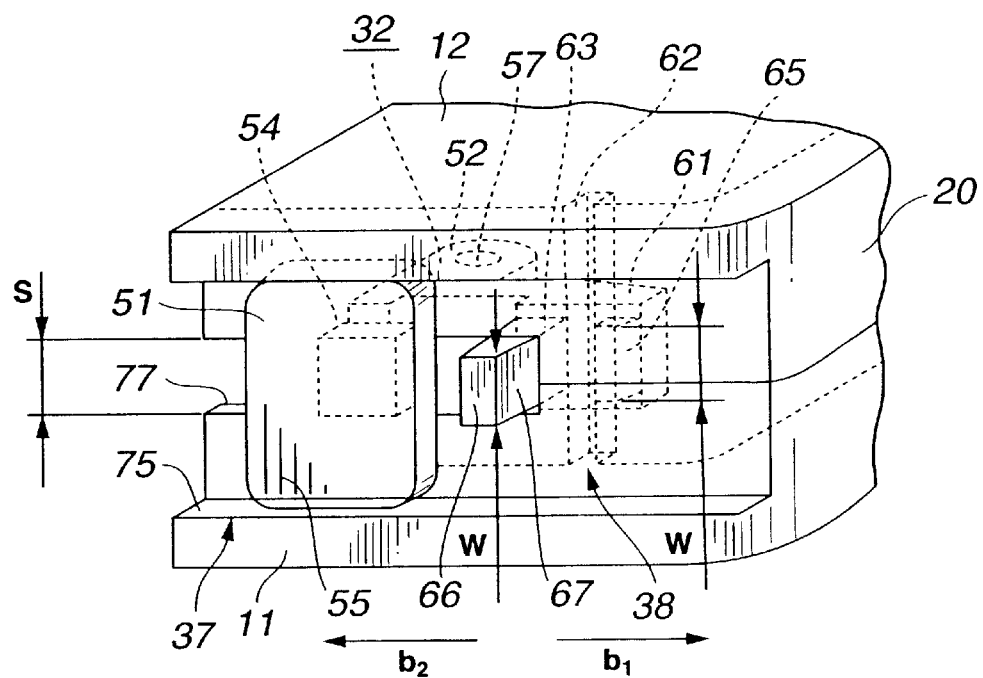
FIG. 16 is a perspective view for explanation of the shutter locking mechanism.
Figure 17:
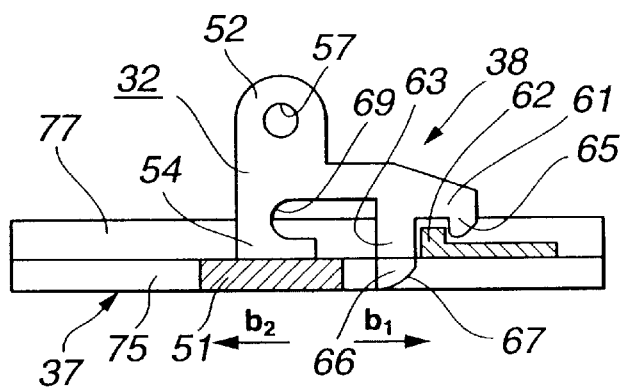
FIG. 17 is a cross section showing the locking member of the shutter locking mechanism on the engagement projection.
Figure 18:
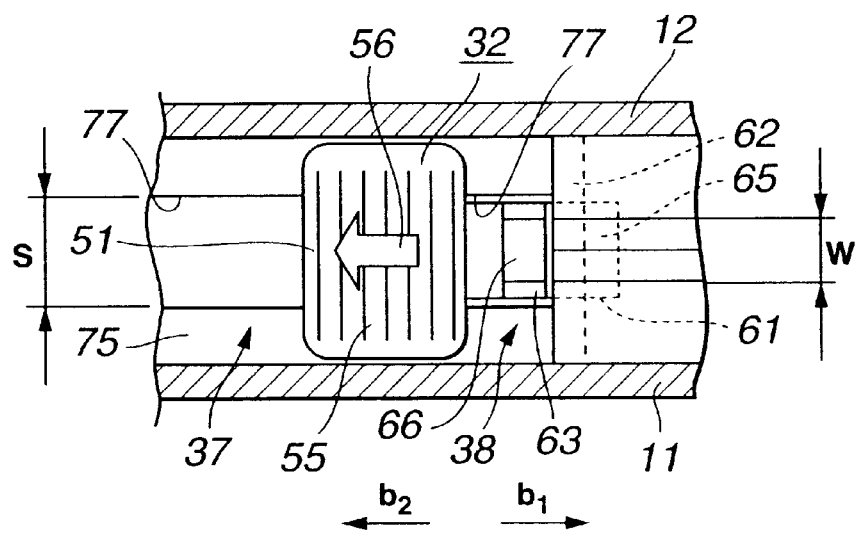
FIG. 18 is an axial sectional view showing the engagement of the locking member of the shutter locking mechanism with the engagement projection.

As shown in FIGS. 16, 17 and 18, the engagement projection 62 is provided at the support surface 37 on the inner circumferential wall of the lateral side of the cartridge body 6. The engagement projection 62 is formed linear generally perpendicularly to the moving direction of the operating member 32.

As shown in FIGS. 12, 13, 14 and 15, the unlocking portion 63 has an unlocking pawl 66 formed integrally with the coupling 52 of the operating member 32 to be elastically displaceable and in a position adjacent to the engagement pawl 65 of the locking portion 61. The unlocking pawl 66 is outside the cartridge body 6. As shown in FIGS. 12 and 13, the unlocking pawl 66 has formed on one lateral side thereof directed towards the front end 20 of the cartridge body 6 an operating surface 67 having a generally circular section and which is to be pushed in the direction of arrow $b_2$.

Therefore, the locking portion 61 and unlocking portion 63 of the shutter locking mechanism 38 are movable along with the operating member 32 in the directions of arrows $b_1$ and $b_2$.

Further, as shown in FIG. 13, the operating member 32 has formed in a position between the coupling 52 and operating piece 51 a generally circular cut 69 to allow the locking portion 61 and unlocking portion 63 to easily be moved elastically in the direction of arrows $d_1$ and $d_2$. Therefore, when the operating member 32 is pushed at the operating surface 67 of the unlocking portion 63 in the direction of arrow $b_2$, the locking portion 61 and unlocking portion 63 are easily moved elastically in the direction of arrow $d_2$.

Figure 19:
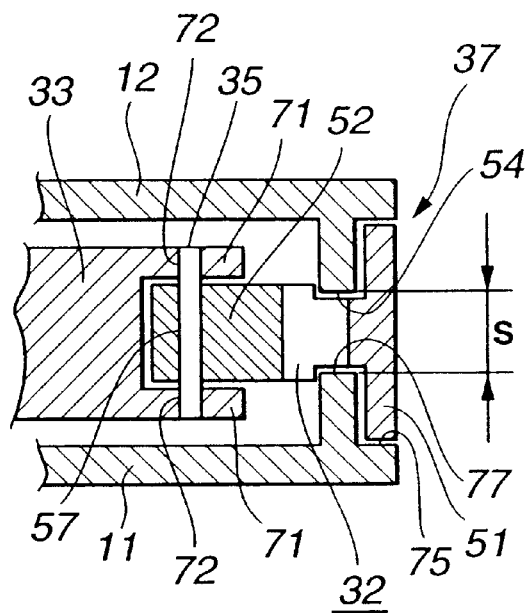
FIG. 19 is an axial sectional view for explanation of the shutter locking mechanism.

As shown in FIGS. 9 and 19, the transmission member 33 has formed integrally at one end thereof the first pivot 34 connected to the guide member 31 and integrally at the other end a pair of support projections 71 to support the coupling of the operating member to be pivotable. Each of the support projections 71 has formed through it a pivot hole 72 and the second pivot 35 is inserted through the pivot holes 72. As shown in FIG. 19, in the transmission member 33, the second pivot 35 inserted through the pivot holes 72 in the support projections 71 is further inserted through the pivot hole 57 in the coupling 52 of the operating member 32 which is thus supported pivotably. Note that the second pivot 35 is made of a stainless steel for example.

As shown in FIGS. 8 and 9, the transmission member 33 has a portion thereof near the coupling 44 of the guide member 31 formed generally circular convexly towards the upright walls 13 and 14 of the cartridge body 6 in relation to a straight line $l_0$ connecting the center of pivoting of the first pivot 34 and that of the second pivot 35. Also as shown in FIGS. 8 and 9, because of the generally circular portion of the transmission member 33 near the coupling 44 of the guide member 31, an operating force applied to the transmission member 33 longitudinally of the latter when the shutter plate 25 is moved in the direction of arrow $a_1$ and thus the operating member 32 is moved in the direction of arrow $b_1$ acts as a component $f_1$ divided in a direction parallel to the moving direction of the guide member 31. Thus, the guide member 31 can be moved. Note that the transmission member 33 may have a longitudinal intermediate portion thereof formed swelling outwardly of the cartridge body 6.

Also, since the transmission member 33 has formed therein a cut 57 to prevent interference with a guide wall 59 (which will further be described later) of the guide recess 36 when the transmission member 33 is pivoted about the first or second pivot 34 or 35, as shown in FIG. 9, it can operate positively.

Figure 23:
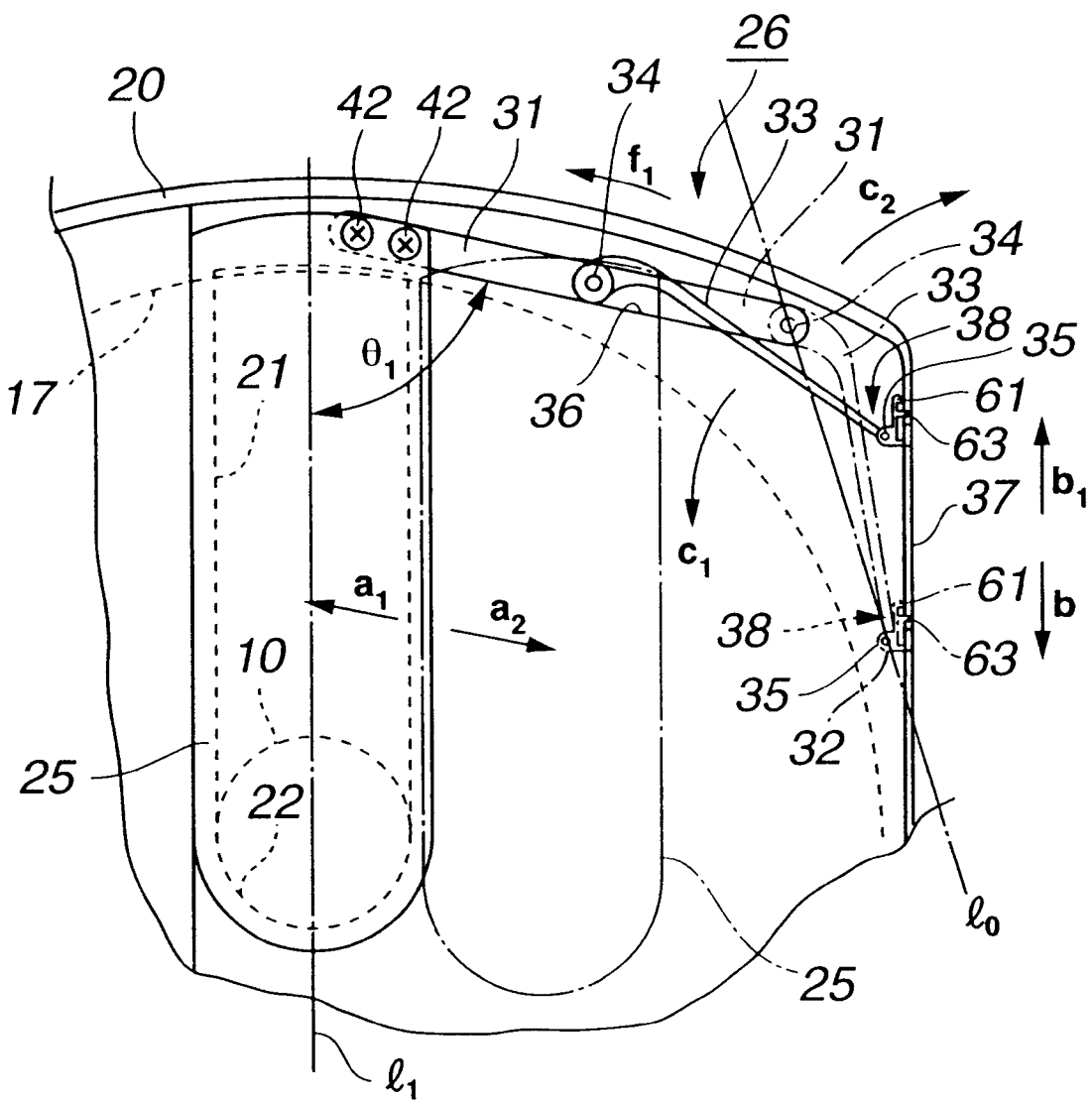
FIG. 23 is a plan view of the essential parts for explanation of the opening and closing operation of the shutter open/close mechanism.

As shown in FIGS. 6 and 23, the guide recess 36 is formed linear in the lower shell 12 obliquely relative to the width of the cartridge body 6, perpendicular to the direction of insertion into the recorder/player. It is formed in a position adjacent to the front end 20 of the lower shell 12 as shown. That is, as shown in FIG. 23, the guide recess 36 is formed oblique with a predetermined angle $\theta_1$, smaller than 90°, relative to a center line $l_1$ of the width of the cartridge body 6. As shown in FIG. 11, there is formed integrally with and projecting from the circumference of the guide recess 36 the guide wall 59 which is in sliding contact with the guide member 31. The guide member 31 is movably inserted at one lateral side thereof in the guide recess 36 and projects somewhat in the shutter moving concavity 28 of the lower shell 12. Also, the guide recess 36 has a length which is a sum of the length of the guide member 31 and the moving distance of the shutter plate 25, a little larger than the width of the access opening 21 and drive opening 22.

As shown in FIGS. 6, 12 and 16, the support surfaces 37 formed on the lateral sides of the upper and lower shells 11 and 12, parallel to the direction of insertion into the recorder/player, define between them a guide concavity 75 in which the operating piece 51 of the operating member 32 is disposed movably in the directions of arrows $b_1$ and $b_2$. The guide concavity 75 is formed to have a depth a little larger than the thickness of the operating piece 51 of the operating member 32 as shown in FIGS. 12 and 16 so that the operating piece 51 will not project from the lateral side of the cartridge body 6. Also, the guide concavity 75 is open at one end thereof at the front end 20 of the cartridge body 6 such that a shutter operating member 81 of the recorder/player, which will further be described later, can be introduced into the guide concavity 75 in the direction of arrow $b_2$ from the open end of the guide concavity 75 at the front end 20 of the cartridge body 6.

Further, as shown in FIGS. 16, 17, 18 and 19, the guide concavity 75 has formed therein between the upper and lower shells 11 and 12 an engagement slit 77 open to near the engagement projection 62 and whose surfaces are movably engaged in the engagement recesses 54, respectively, of the operating member 32. The engagement slit 77 has a width s somewhat larger than the space between the bottoms of the engagement recesses 54 of the operating member 32 as shown in FIG. 19.

Further, in the operating member 32, the engagement pawl 65 of the locking portion 61 and unlocking pawl 66 of the unlocking portion 63 are formed to have a predetermined width w a little smaller than the width s of the engagement slit 77 as shown in FIGS. 16 and 18, so that they will not touch the surfaces of the engagement slit 77. Therefore, the operating member 32 can be moved positively in the directions of arrows $b_1$ and $b_2$ without being interfered with by the engagement pawl 65 and unlocking pawl 66 projected inside the engagement slit 77.

Figure 21:
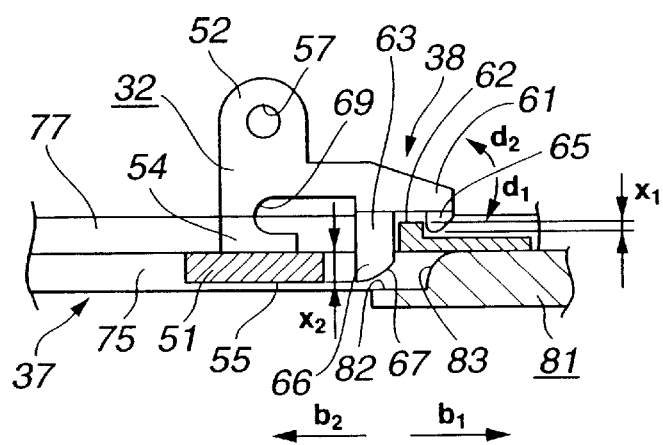
FIG. 21 is a cross section showing the abutment of the operating member of the recorder/player to the unlocking member of the shutter locking mechanism.
Figure 22:
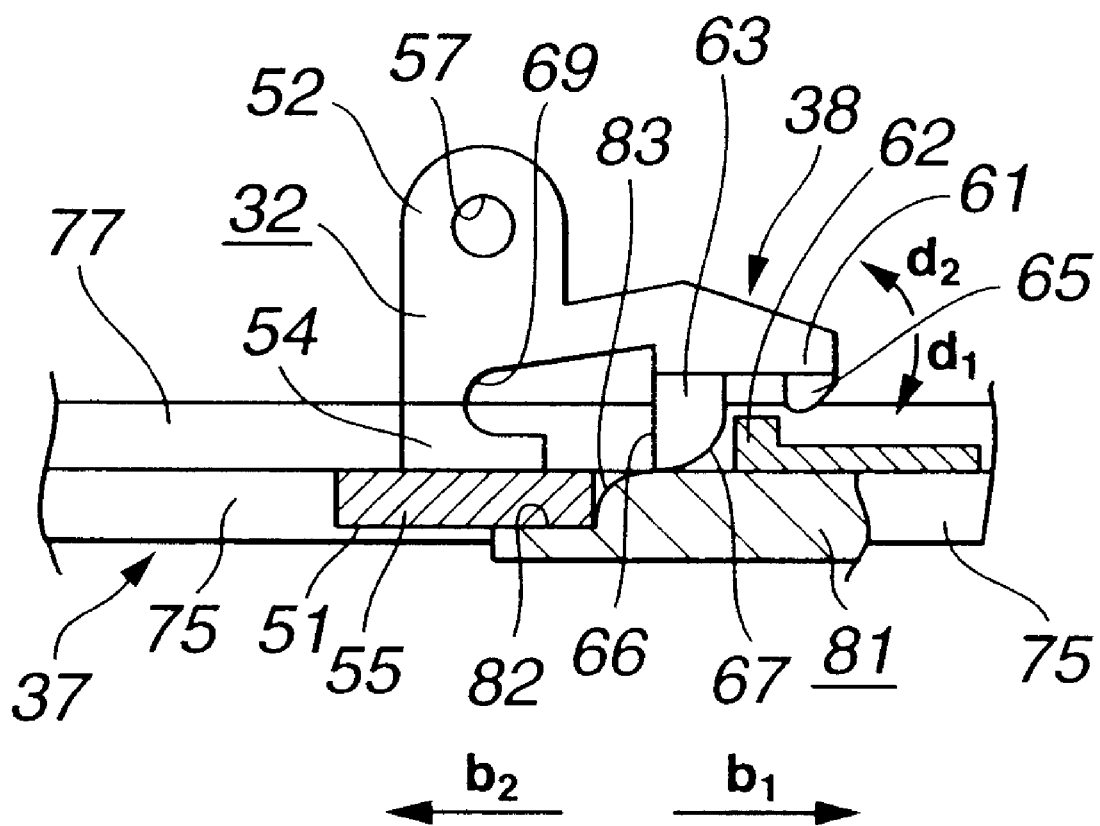
FIG. 22 is a cross section showing the disengagement of the locking member of the shutter locking mechanism from the engagement projection.

In the aforementioned shutter locking mechanism 38, the engagement pawl 65 of the locking portion 61 is formed to project $x_1$ and engages with the engagement projection 62 and the unlocking pawl 66 of the unlocking portion 63 is formed to project $x_2$ from inside the guide slit 77 as shown in FIG. 21. The projection $x_2$ of the unlocking pawl 66 is larger than the projection $x_1$ of the engagement pawl 65. Thus, in the shutter locking mechanism 38, when the unlocking pawl 66 is pushed in by the shutter operating member 81 of the recorder/player, the engagement pawl 65 is disengaged from the engagement projection 62 as shown in FIGS. 21 and 22. That is, the unlocking pawl 66 can be moved over a sufficiently long distance to unlock the shutter. Therefore, in the shutter locking mechanism 38, as the unlocking pawl 66 is moved, the engagement pawl 65 is disengaged from the engagement projection 62 positively.

In the shutter open/close mechanism 26 constructed as in the above, the opening and closing of the shutter plate 25 and operation of the shutter locking mechanism 38 will be described below with the accompanying drawings;

First, in the shutter open/close mechanism 26, when the shutter plate 25 has been moved to the closing position where it closes the access opening 21 and drive opening 22, the engagement pawl 65 of the shutter locking mechanism 38 is engaging with the engagement projection 62 to lock the shutter plate 25 against movement as shown in FIGS. 17 and 18.

Figure 20:
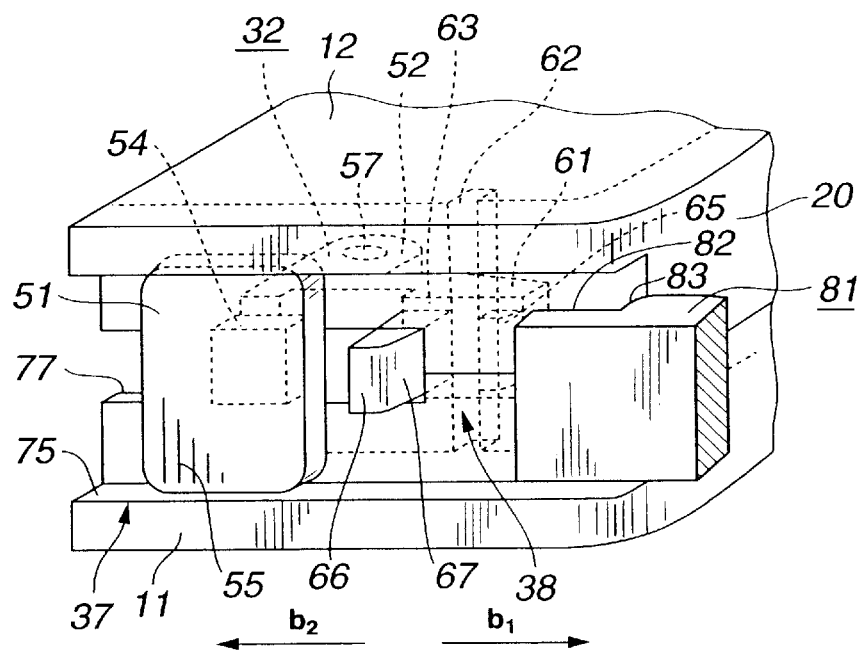
FIG. 20 is a perspective view for explanation of the disengagement of the locking member of the shutter locking mechanism from the engagement projection.

In the shutter open/close mechanism 26, when the shutter plate 25 is moved in the direction of arrow $a_2$ to open the access opening 21 and drive opening 22, the operating member 32 and shutter locking mechanism 38 are operated by the shutter operating member 81 of the recorder/player as shown in FIGS. 20 and 21. As shown in FIGS. 20 and 21, the shutter operating member 81 has formed at the end thereof an engagement surface 82, roughed for example, engaging with the non-slip recesses 55 on the operating piece 51 of the operating member 32. Also, the shutter operating member 81 has formed thereon, by cutting, an abutment surface 83 having a generally circular section and abutting the operating surface 67 of the unlocking pawl 66 of the shutter locking mechanism 38. Note that the shutter operating member 81 may be formed from a rubber or leaf spring capable of engaging with the operating piece 51 and the engagement surface 82 may be coated with rubber in this case.

In the shutter locking mechanism 38, the abutment surface 83 of the shutter operating member 81, having entered along the guide concavity 75 of the support surface 37 in the direction of arrow $b_2$, will abut the operating surface 67 of the unlocking pawl 66 which in turn will be pushed into the engagement slit 77 of the unlocking pawl 66, as shown in FIGS. 21 and 22.

In the shutter locking mechanism 38, as the unlocking pawl 66 is pushed by the shutter operating member 81, the engagement pawl 65 of the locking portion 61 is elastically moved in the direction of arrow $d_2$ so that the engagement pawl 65 is disengaged from the engagement projection 62 as shown in FIGS. 21 and 22. In the shutter locking mechanism 38, this disengagement of the engagement pawl 65 of the locking portion 61 from the engagement projection 62 will allow the operating member 32 to be movable in the direction of arrow $b_2$.

As shown in FIG. 22, the engagement surface 82 of the shutter operating member 81, having further entered in the direction of arrow $b_2$, will engage with the non-slip recesses 55 on the operating piece 51. As the shutter operating member 81 is moved, the operating member 32 will be moved in the direction of arrow $b_2$.

As the operating member 32 is moved in the direction of arrow $b_2$, it will cause the end of the transmission member 33 to pivot about the second pivot 35 in the direction of arrow $c_2$, as shown in FIG. 23. Since the transmission member 33 is thus pivoted about the second pivot 35, it is pivoted about the first pivot 34 to move the guide member 31 in the direction of arrow $a_2$. The guide member 31 is moved along the guide recess 36 until it abuts one end of the guide recess 36. Then the guide member 31 is stopped from being moved, and the shutter plate 25 is moved to a position where the access opening 21 and drive opening 22 are opened.

Also in the shutter open/close mechanism 26, as the shutter plate 25 is moved in the direction of arrow $a_1$ to close the access window 21 and drive opening 22, the operating member 32 is moved in the direction of arrow $b_1$, as shown in FIG. 23.

Since the operating member 32 is thus moved in the direction of arrow $b_1$ along with the movement of the shutter operating member 81, it will cause the end of the transmission member 33 to pivot about the second pivot 35 in the direction of arrow $c_1$. Also, since the transmission member 33 is thus pivoted about the second pivot 35, it is pivoted about the first pivot 34 to move the guide member 31 in the direction of arrow $a_1$. As the guide member 31 is moved along the guide recess 36 until it abuts one end of the guide recess 36 and thus stopped from being moved. Thus, the shutter plate 25 is moved to a position where it closes the access window 21 and drive opening 22.

The transmission member 33 is pivoted about the second pivot 35 in the direction of arrow $c_1$ to transmit the operating force from the operating member 32 in the moving direction of the guide member 31. That is, the transmission member 33 can transmit the operating force in the moving direction of the guide member 31 since its end portion near the connecting end 44 of the guide member 31 is formed circular convexly outwardly of the cartridge body 6 (towards the upright walls 13 and 14) in relation to the straight line $l_0$.

Also, in the shutter locking mechanism 38, as the shutter operating member 81 is moved in the direction of arrow $b_1$, the unlocking pawl 66 of the unlocking portion 63 is elastically moved in the direction of arrow $d_1$ and the engagement pawl 65 of the locking portion 61 is disengaged from the engagement projection 62 as shown in FIGS. 21 and 22. Therefore, in the shutter locking mechanism 38, the shutter plate 25 is moved to the closing position where it closes the access opening 21 and drive opening 22, it is locked against movement and held in the closing position as shown in FIG. 21.

In the disc cartridge 1 constructed as in the above, the shutter plate 25 is operated by the shutter open/close mechanism 26 to open and close the access opening 21 and drive opening 22 as will be described below with reference to the accompanying drawings:

First, the disc cartridge 1 is set into the cartridge loader in the recorder/player with the access opening 21 and drive opening 22 being closed by the shutter plate 25 as shown in FIG. 3.

When the disc cartridge 1 is set in the cartridge loader, the shutter operator (not shown) of the recorder/player will move the operating member 32 of the shutter open/close mechanism 26 in the direction of arrow $b_2$. As shown in FIGS. 3, 4 and 23, as the operating member 32 in the shutter open/close mechanism 26 is thus moved in the direction of arrow $b_2$, the transmission member 33 is moved longitudinally to move the guide member 31 along the guide recess 36 in the direction of arrow $a_2$. Since the guide member 31 is thus moved in the direction of arrow $a_2$, the shutter plate 25 is moved in the direction of arrow $a_2$ to open the access opening 21 and drive opening 22.

Then, the disc table of the disc rotation drive mechanism of the recorder/player enters the disc cartridge 1 from the drive opening 22 to drive the optical disc 5 (this is not illustrated), while the optical pickup of the recorder/player enters the disc cartridge 1 from the access opening 21 to write and read information to and from the optical disc 5.

As having been described in the foregoing, the guide recess 36 formed in the main side of the cartridge body 6 to be oblique relative to the width of the cartridge body 6 in the disc cartridge 1 allows to freely shape the front end 20 of the cartridge body 6, at which the disc cartridge 1 is first inserted into the recorder/player. Thus, since it is possible to easily know the correction direction of inserting the cartridge 6 into the recorder/player, the disc cartridge 1 cannot be inserted in any wrong direction into the recorder/player.

Also, in the shutter open/close mechanism 26 of the disc cartridge 1, since the transmission member 33 is provided as pivotably connected to the guide member 31 and operating member 32 by means of the first and second pivots 34 and 35, the shutter plate 25 can be moved positively to open and close the access opening 21 and drive opening 22.

In this disc cartridge 1, since the shutter locking mechanism 38 securely locks, against movement, the shutter plate 25 having been moved to the closing position where it closes the access opening 21 and drive opening 22, the shutter plate 25 can be prevented from being inadvertently opened, dust can be prevented from entering into the cartridge body 6, and also the optical disc 5 encased in the cartridge body 6 can be prevented from being broken.

Further in this shutter locking mechanism 38, since the engagement pawl 65 of the locking portion 61 can be disengaged from the engagement projection 62 by the shutter operating member 81 of the recorder/player, so the shutter operating mechanism of the recorder/player can be designed more simplified. That is, the shutter operating mechanism of the recorder/player can be designed more easily for example by providing the shutter operating member at a predetermined position inside the cartridge holder in which the disc cartridge 1 according to the present invention is to be held.

Further, in the disc cartridge 1 according to the present invention, since the shutter open/close mechanism 26 is located outside the upright walls 17 and 18 of the disc compartment 16 and in the space isolated from the disc compartment 16, abrasion powder produced as the guide member 31, operating member 32 and transmission member 33 are slid repeatedly is prevented to come into the disc compartment 16, whereby information can be written and read to and from the optical disc 5 with a highly improved reliability.

Figure 24:
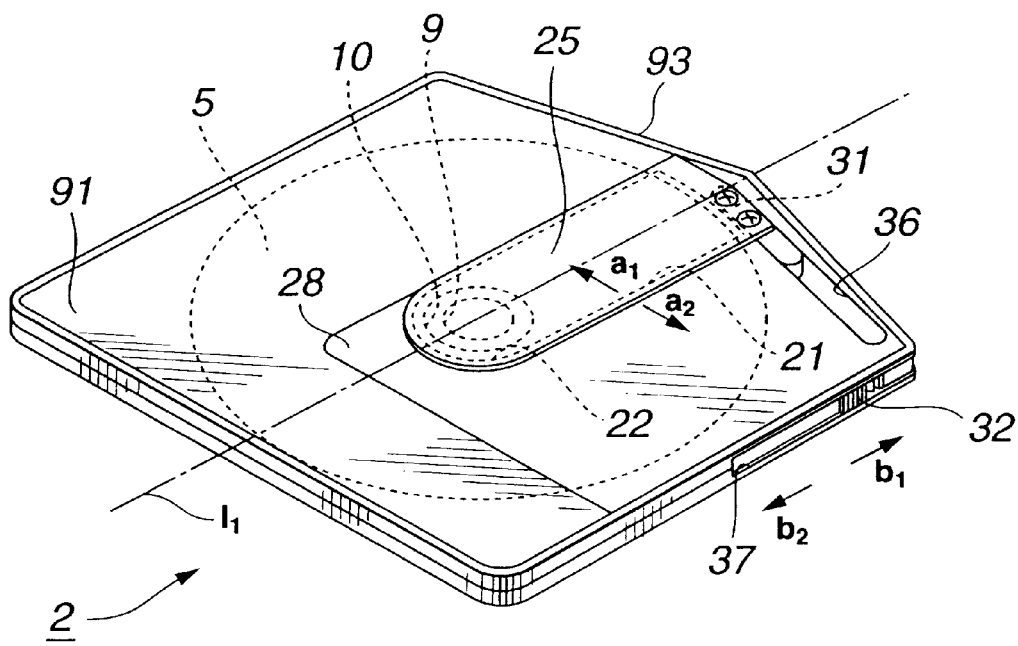
FIG. 24 is a perspective view of a variant of the disc cartridge according to the present invention.

Note that the front end 20 of the aforementioned disc cartridge 1 is formed circular convexly in relation to the recorder/player but may of course be formed in any other shape as shown in FIG. 24 for example. This variant of the disc cartridge according to the present invention, having the front end thereof formed otherwise than in the above, will briefly be described below with reference to FIG. 24. The same elements and portions in this variant shown in FIG. 24 as those in the disc cartridge having been described in the foregoing will be indicated with the same references for the convenience of illustration and will not be described any further.

As shown in FIG. 24, the other disc cartridge 2 is only different from the aforementioned embodiment in that the cartridge body 91 has the front end 93 thereof formed generally symmetrically triangular with respect to the center line $l_1$ of the width of the cartridge body 91. Therefore, owing to this front end shape, the user can easily know visually and by touching the correct direction of inserting the disc cartridge 2 into the reorder/player.

In the aforementioned disc cartridges 1 and 2, the front ends 20 and 93 are formed symmetrically circular and/or polyhedral with respect to the center line $l_1$ of the width of the cartridge bodies 6 and 91 but the front end may be formed asymmetrical with respect to the center line $l_1$.

Figure 25:
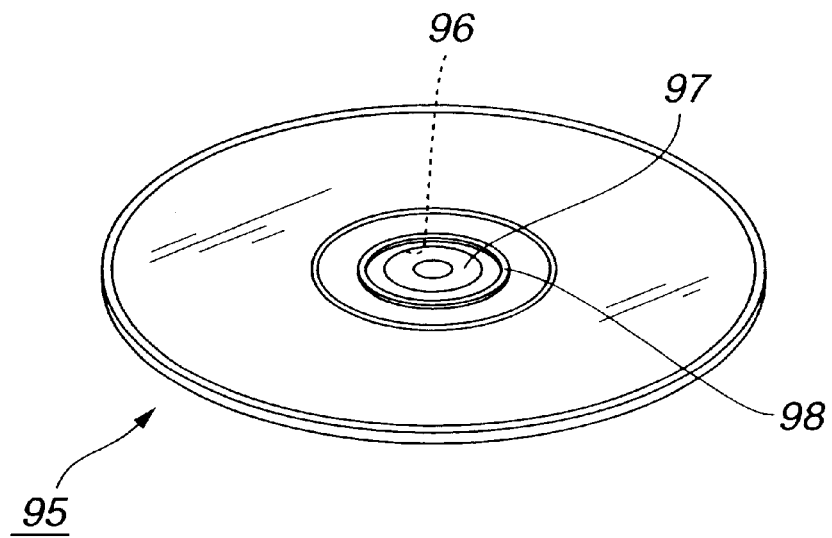
FIG. 25 is a perspective view of a variant of the optical disc.

Also, in the above disc cartridges 1 and 2, the cartridge bodies 6 and 91 have the compartment 23 defined by the annular projection 24, in which the chucking plate 10 is provided to hold the optical disc 5. However, it should be noted that as shown in FIG. 25, there may be fixed over a center hole 96 of the optical disc 95 a chucking plate 97 around which an annular projection 98 is formed.

In the disc cartridges 1 and 2, the shutter plate 25 is provided exposed outside. However, a shutter cover may be provided to cover the moving range of the shutter plate 25. This variant of the disc cartridge according to the present invention will be described below with reference to the accompanying drawings. Note that the same elements in this second variant in FIGS. 26 and 27 as those in the disc cartridges 1 and 2 will be indicated with the same references as in the aforementioned disc cartridges 1 and 2 and will not be described any further.

Figure 26:
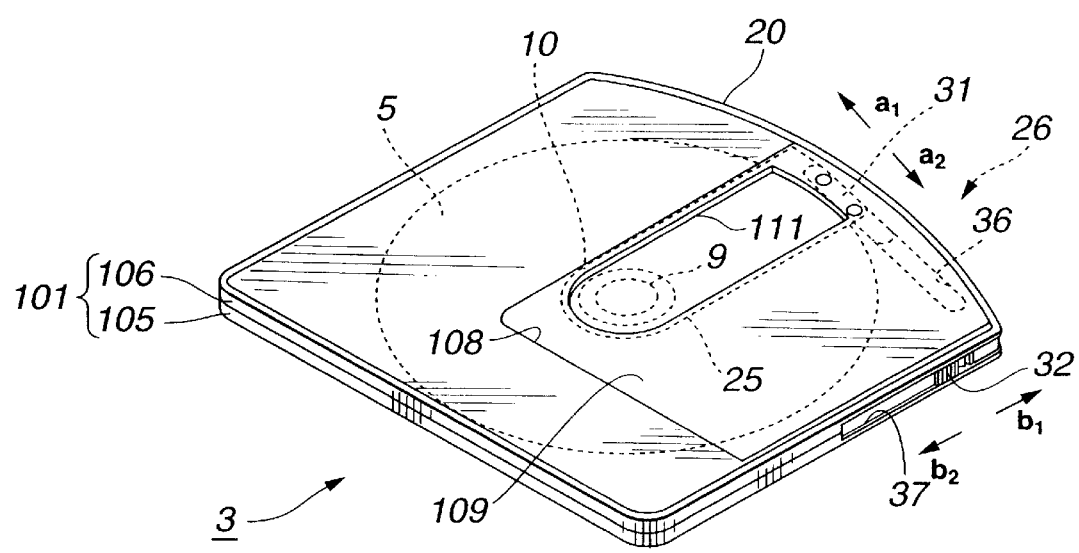
FIG. 26 is a perspective view of another variant of the disc cartridge according to the present invention.
Figure 27:
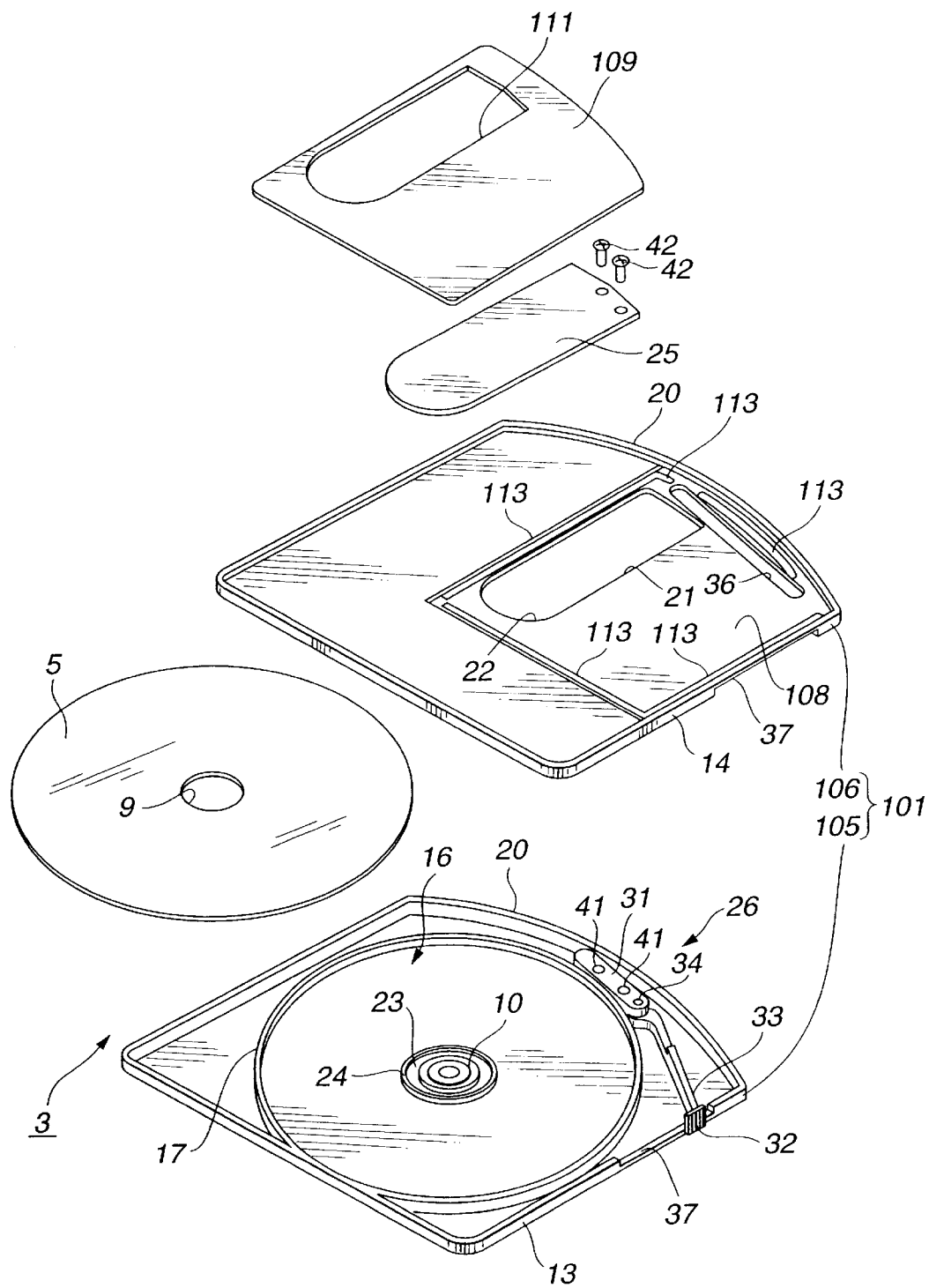
FIG. 27 is an exploded perspective view of the disc cartridge in FIG. 26.

As shown in FIGS. 26 and 27, the variant of the disc cartridge is generally indicated with a reference 3, and includes a cartridge body 101 formed from a set of upper and lower shells 105 and 106. In the cartridge body 101, the upper shell 105 has formed thereon a concavity 108 in which the shutter plate 25 is movable, as shown in FIGS. 26 and 27. Further, the disc cartridge 3 includes a shutter cover 109 to cover the concavity 108 as shown in FIGS. 26 and 27.

The concavity 108 in which the shutter plate 25 is movable is slightly larger in area than the moving range of the shutter plate 25 moving over the access opening 21 and drive opening 22 and deeper than the thickness of the shutter plate 25 so that the shutter plate 25 will not protrude to above the main side of the cartridge body 101.

The shutter cover 109 is formed from a resin such as polycarbonate or a metal such as stainless steel, aluminum or the like to be generally rectangular and flat. The shutter cover 109 is 0.2 to 0.5 mm thick. As shown in FIGS. 26 and 27, the shutter cover 109 has an opening 111 formed in the main side thereof and in a position corresponding to the access opening 21 and drive opening 22. The opening 111 is somehow larger in area than the access and drive openings 21 and 22 and slightly smaller in area than the shutter plate 25.

The shutter cover 109 is attached in the concavity 108 with an adhesive tape 93 having an adhesive layer on either side thereof or an adhesive applied on the inner side thereof facing the bottom of the concavity 108 along the peripheral edge thereof. The adhesive tape 93 has a predetermined thickness which will assure a predetermined gap in which the shutter plate 25 can be moved inside the concavity 108. The shutter cover 109 thus attached in the concavity 108 covers the moving range of the shutter plate 25 and guide recess 36 of the shutter open/close mechanism 26.

In the above disc cartridge 3, since the shutter cover 109 is provided as in the above to cover the moving range of the shutter 25, it is possible to prevent dust from coming into the cartridge body 101 from the clearance between the shutter plate 25 and cartridge body 101 when the shutter plate 25 is covering the access opening 21 and drive opening 22. Also in the disc cartridge 3, since the guide recess 36 is covered by the shutter cover 109, it is possible to prevent dust from coming into the cartridge body 101 from the guide recess 36. Therefore, in the disc cartridge 3, information can be written or read to or from the magneto-optical disc 5 with an improved reliability.

The aforementioned disc cartridges 1, 2 and 3 are designed such that the optical pickup approaches the optical disc through the access opening 21. However, it is should be noted that there may be provided in a position opposite to the access opening 21 another access opening through which a magnetic field application head or the like comes in and another shutter plate to open and close the access opening.

What is claimed is:

1. A disc cartridge comprising:

a disc-shaped recording medium;

a cartridge body having formed therein a disc compartment to house the disc-shaped recording medium;

an access opening formed in the cartridge body and through which a part of the recording area of the disc-shaped recording medium, extending between lead-in and lead-out areas, in exposed outside for data read and write;

a shutter member provided movably to open and close the access opening; a shutter open/close mechanism including:

a guide recess formed in a main side of the cartridge body to be oblique in relation to a width of the cartridge body to support the shutter member movably along said guide recess along a path parallel to the width of said cartridge body;

a guide member supporting the shutter member and movably engaged in the guide recess, an operating member to move the guide member;

a transmission member linking the guide member and the operating member to each other to transmit an operating force from the operating member to the guide member; and support surfaces formed on the cartridge body to support the operating member movably; and a shutter locking mechanism disposed on the lateral side of the cartridge body to inhibit the shutter member from moving.

2. The disc cartridge as set forth in claim 1, wherein the transmission member is pivotably connected to the guide member and/or operating member.

3. The disc cartridge as set forth in claim 1, wherein the cartridge body has a front end, at which the cartridge is to be first inserted into a recorder and/or player, formed circular and/or polyhedral.

4. The disc cartridge as set forth in claim 1, wherein the operating member is disposed on a lateral side of the cartridge body, generally perpendicular to the moving direction of the shutter member.

5. The disc cartridge as set forth in claim 1, wherein the transmission member and the guide member are moved in directions generally perpendicular to each other, respectively.

6. The disc cartridge as set forth in claim 1, wherein the shutter locking mechanism includes a locking member formed integrally with the operating member of the shutter open/close mechanism to lock the shutter member against movement.

7. The disc cartridge as set forth in claim 6, wherein the locking member engages with an inner wall of the lateral side of the cartridge body.

8. The disc cartridge as set forth in claim 6, wherein the shutter locking mechanism includes an unlocking member formed integrally with the locking member to be elastically movable and which elastically moves the locking member to cancel a locking by the locking member.

9. The disc cartridge as set forth in claim 6, wherein the support surfaces of the shutter open/close mechanism have support recesses formed in the lateral sides of the cartridge body to support the operating member movably and the locking member and/or an unlocking member are formed smaller than the width of the support recesses and provided movably in the support recesses.

10. The disc cartridge as set forth in claim 9, wherein the unlocking member is provided outside of the cartridge body.

* * * * *